UNITED STATES PATENT OFFICE.

CARL STEFFEN, OF VIENNA, AUSTRIA-HUNGARY.

PROCESS OF EXTRACTING SUGAR FROM MOLASSES, SIRUPS, AND THE JUICES OF PLANTS.

SPECIFICATION forming part of Letters Patent No. 294,159, dated February 26, 1884.

Application filed June 6, 1883. (No specimens.) Patented in Germany March 26, 1883, and in Austria May 3, 1883.

*To all whom it may concern:*

Be it known that I, CARL STEFFEN, of the city of Vienna, in the Empire of Austria, have invented certain Improvements in Processes of Extracting Sugar from Molasses, Sirups, and the Juices of Plants, of which the following is a specification.

My invention relates to certain improvements in processes of extracting sugar described in my Letters Patent No. 277,521, dated May 15, 1883; and in order that my present improvements thereon may be the better understood, I will briefly explain the process therein described.

I first make an aqueous saccharine solution and saturate it with lime, being careful to preserve a temperature between 32° and 95° Fahrenheit. This aqueous lime-saturated solution is then filtered or decanted, in order to free it from the superfluous lime, and it is then mixed with a new or fresh quantity of lime ranging from thirty to one hundred parts, by weight, of lime to one hundred parts of sugar in the solution. The separation of the calcareous saccharate then takes place, and contains no excess of lime, and it is precipitated from the solution without the aid of warmth or alcohol.

The above process requires two dosings with lime, the liquid being filtered and decanted after the first dosing. In my present process I effect the same result in a shorter time by adding the lime to the aqueous saccharine solution all at one dose. In order to do this, however, either the temperature of the saccharine liquid must be so low when the lime is added that the heat generated by the admixture of the lime will not raise the temperature of the liquid above 95° Fahrenheit, or suitable means must be employed for refrigerating the mixture, in order to keep its temperature below the maximum of 95° Fahrenheit. In carrying out this part of my process I prefer to employ refrigerating devices to keep the temperature of the liquid in the mixing apparatus below the above-mentioned temperature while the lime is being added. Care should be taken to absorb all the heat generated by the mixture of the lime with the liquid as rapidly as may be, in order that the temperature shall not rise, if possible, much above that possessed by the liquid at starting. In order that the refrigerating-power may be properly gaged, I will say that for each one hundred kilograms of sugar treated from fifteen thousand to twenty thousand units of heat are given off by the application of the necessary quantity of lime. It is very essential that the temperature shall not exceed 95° Fahrenheit, and, as before stated, the desired result may be attained without refrigerating devices by starting at a very low temperature; but in this case the quantity of sugar in the solution treated should be small, in order that a less quantity of lime may be employed to precipitate it. In my former patent stress was laid on the fact that spontaneous precipitation of calcareous sugar or saccharate does not take place (without the aid of artificial heat or alcohol) when the said precipitation is preceded by the formation of a soluble saturated calcareous saccharine compound. A calcareous saccharate is never precipitated from aqueous saccharine solutions (without the aid of artificial heat or alcohol) in such a manner that the lime introduced forms an insoluble precipitating calcareous saccharine compound direct with the sugar, no matter how or under what circumstances the lime was introduced. On the contrary, the lime must first form a soluble lime-saturated calcareous saccharine compound, and only then, when all these requirements have been fulfilled, can a precipitation of calcareous saccharate take place in the presence of a sufficient quantity of lime. If, therefore, we effect the rapid formation of a lime-saturated saccharine solution under given conditions, and the requirements for precipitating the calcareous saccharate with lime are fulfilled, both operations may be effected simultaneously in substance, and the lime needed to effect both results be introduced at one time into the saccharine solution. The conditions referred to relate to refrigeration or keeping down the temperature, and they have been before explained.

The second part of my invention relates to the mixture of the precipitated saccharate, (zuckerkalk) produced as above described, with a saccharine solution, and the further precipitation of insoluble saccharate by adding free lime to the solution, or by adding a further quantity of the calcareous saccharate in lieu of lime. This is a continuation of the process of precipitation, and is based on the fact that, when a calcareous saccharine compound containing more lime per one hundred parts of sugar than is necessary to form a single basic compound is introduced into an aqueous saccharine fluid in such quantity that the sugar in the mixture contains more than fifteen parts (by weight) of calcium oxide to one hundred parts of sugar in solution, the sugar can be separated out of the solution by introducing free lime, the temperature being always kept below 95° Fahrenheit; or, what is the same in substance, so much sugar may be introduced into a precipitated calcareous saccharine compound or admixture above the one basic proportion as the mixture contains more than fifteen parts (by weight) of calcium oxide to one hundred parts of sugar, and then adding a sufficient quantity of free lime. The substitution of the calcareous saccharate in lieu of lime in this continuous step in the precipitation is based on the fact that when a higher calcareous saccharine compound, derived from the first or earlier precipitating operation, is added to a calcareous saccharine solution, (however formed,) nearly all the sugar in the mixture will be precipitated as an insoluble calcareous saccharine compound. When the calcareous saccharine compound so introduced contains so much lime that twenty parts of calcium oxide to one hundred parts of sugar is dissolved in the mixture, the temperature being maintained below 95° Fahrenheit, the calcareous saccharate precipitated as above described is separated from the lye in a suitable filter-press, and the lye may be employed in the precipitation of other portions of sugar. The saccharate is washed and purified.

The third step or part of my process consists in the conversion of the finished and purified saccharate obtained by the preceding processes into a calcareous saccharine solution poor in lime by the action of a free saccharine liquid thereon, which thus removes the superfluous lime before the saccharate is converted into sugar by decomposing acids, in the usual way. In carrying out this step of the process, the hard calcareous saccharate is mixed with a saccharine liquid, and the resulting saccharine solution is separated from the hydrate of lime in a filter-press or other suitable apparatus. This hydrate of lime is waste. The saturated soluble calcareous compound is worked up into sugar in the usual well-known way.

I will merely add, by way of further explanation, that I prefer to employ ground quicklime in my process, and that the precipitated saccharate may be separated from the lye by filter-presses, suction-bags, centrifugal machines, or any apparatuses designed to separate solids from liquids. The saccharate is washed in the filters with pure water at ordinary temperatures, and this water may be employed thereafter for forming saccharine solutions, in order to save or to recover the small amount of saccharine matter in it.

Having thus described my invention, I claim—

1. The herein-described improvement in the art of forming insoluble calcareous saccharate, which consists in mixing with an aqueous saccharine solution enough lime at one dose to form, first, a lime-saturated saccharine solution, and, second, a precipitate of calcareous saccharate, the temperature of the mixture being maintained during the operation below 95° Fahrenheit, and as nearly uniform as possible, substantially as set forth.

2. The herein-described process of forming calcareous saccharate, which constitutes a continuous step in my process, and which consists in mixing previously-precipitated saccharate with an aqueous saccharine solution, and then precipitating the saccharate by the addition of lime or a further quantity of the saccharate, substantially as set forth.

3. The herein-described process of reducing the percentage of lime in the finished and purified saccharate before its conversion into sugar, which consists in mixing the hard, purified saccharate with a saccharine liquid, and then separating the precipitated hydrate of lime by filtering, substantially as set forth.

CARL STEFFEN.

Witnesses:
EDWIN A. BRYDGES,
ANTHONY STEFFEN.